United States Patent
Kuscher et al.

(10) Patent No.: US 9,323,452 B2
(45) Date of Patent: Apr. 26, 2016

(54) SYSTEM AND METHOD FOR PROCESSING TOUCH INPUT

(71) Applicant: Google Inc., Mountain View, CA (US)

(72) Inventors: Alexander Friedrich Kuscher, San Francisco, CA (US); Stefan Kuhne, San Jose, CA (US); John Nicholas Jitkoff, Palo Alto, CA (US)

(73) Assignee: GOOGLE INC., Mountain View, CA (US)

( * ) Notice: Subject to any disclaimer, the term of this patent is extended or adjusted under 35 U.S.C. 154(b) by 110 days.

(21) Appl. No.: 13/625,795

(22) Filed: Sep. 24, 2012

(65) Prior Publication Data

US 2015/0205516 A1   Jul. 23, 2015

(51) Int. Cl.
| | |
|---|---|
| *G06F 3/0488* | (2013.01) |
| *G06F 3/0481* | (2013.01) |
| *G06F 3/0484* | (2013.01) |
| *G06F 3/0482* | (2013.01) |
| *G06F 3/0489* | (2013.01) |

(52) U.S. Cl.
CPC .......... *G06F 3/04883* (2013.01); *G06F 3/0482* (2013.01); *G06F 3/04817* (2013.01); *G06F 3/04842* (2013.01); *G06F 3/04895* (2013.01)

(58) Field of Classification Search
CPC ............ G06F 3/04895; G06F 3/04817; G06F 3/0482; G06F 3/04842; G06F 3/04883
See application file for complete search history.

(56) References Cited

U.S. PATENT DOCUMENTS

| | | | | |
|---|---|---|---|---|
| 6,424,359 | B1 | 7/2002 | Kobayashi | |
| 7,840,912 | B2* | 11/2010 | Elias et al. | 715/863 |
| 8,622,742 | B2* | 1/2014 | Benko et al. | 434/118 |
| 2008/0062207 | A1 | 3/2008 | Park | |
| 2008/0094356 | A1 | 4/2008 | Ording et al. | |
| 2008/0163130 | A1* | 7/2008 | Westerman | 715/863 |
| 2009/0100383 | A1* | 4/2009 | Sunday et al. | 715/863 |
| 2009/0284532 | A1 | 11/2009 | Kerr et al. | |
| 2010/0289825 | A1* | 11/2010 | Shin et al. | 345/667 |
| 2011/0157046 | A1* | 6/2011 | Lee et al. | 345/173 |
| 2013/0030815 | A1* | 1/2013 | Madhvanath et al. | 704/275 |
| 2013/0152001 | A1* | 6/2013 | Lovitt et al. | 715/765 |

\* cited by examiner

*Primary Examiner* — Jennifer To
*Assistant Examiner* — John Repsher, III
(74) *Attorney, Agent, or Firm* — McDermott Will & Emery LLP

(57) ABSTRACT

A system and method for processing a touch input are provided. An initial press action that is associated with a number of simultaneous touches is detected on a touch interface. One or more commands that are mapped to one or more sequences of user interaction is determined based on the number of simultaneous touches, where each of the one or more sequences of user interaction is initiated by the initial press action. One or more graphical interface components, where each of the one or more graphical interface components correspond to a different one of the one or more sequences of user interaction are provided for display. Each of the one or more graphical interface components indicate at least part of the corresponding sequence of user interaction and indicates respective command mapped to the corresponding sequence of user interaction.

17 Claims, 8 Drawing Sheets

200

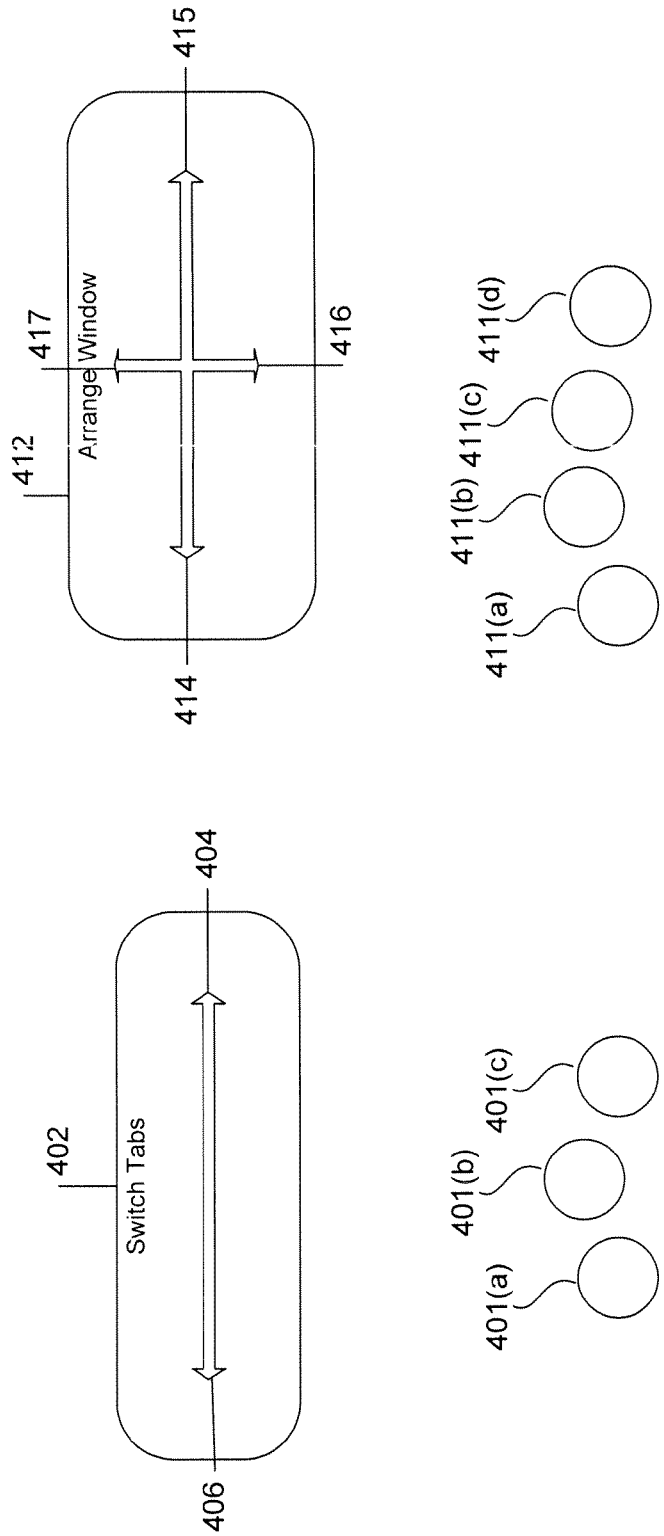

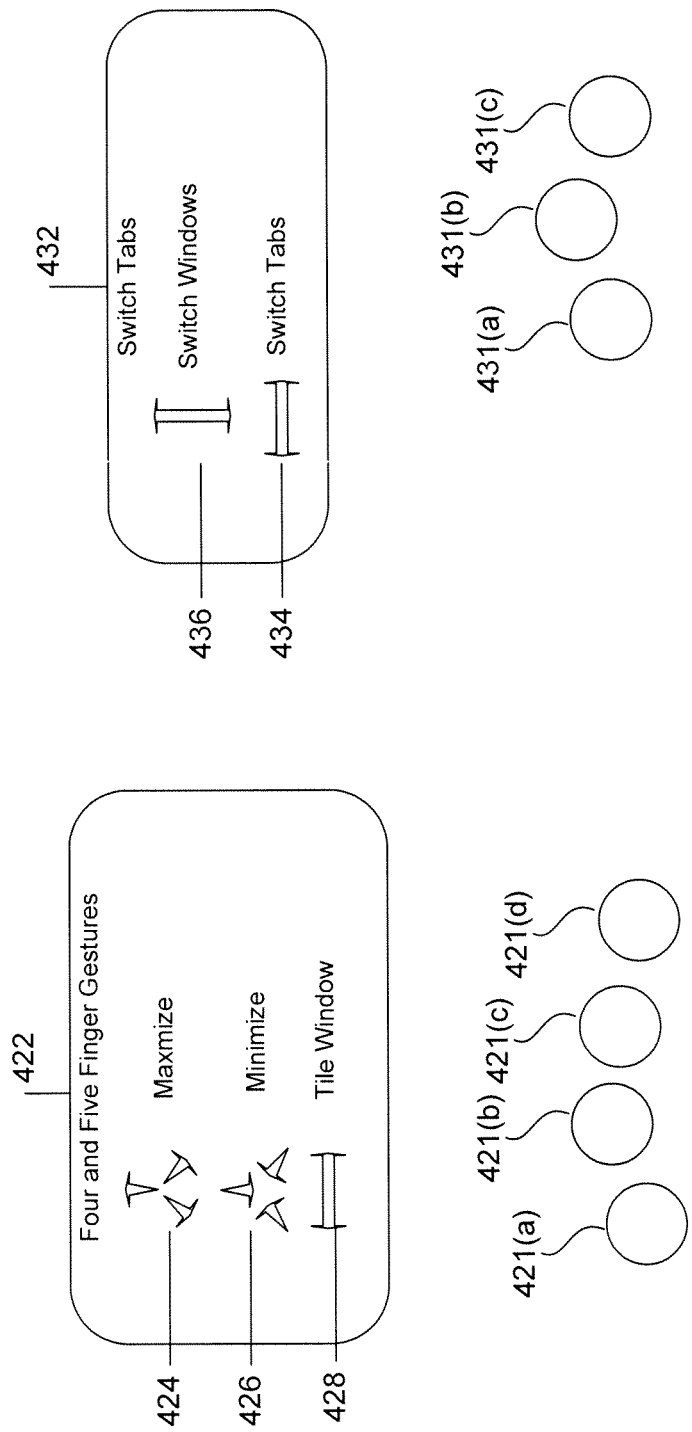

SYSTEM AND METHOD FOR PROCESSING TOUCH INPUT

FIELD

The subject technology generally relates to processing touch input, and in particular, relates to processing touch input with respect to a touch interface of an electronic device.

BACKGROUND

Electronic devices that support a touchscreen and/or touch pad interface allow users to issue user commands via the touchscreen and/or touch pad of the respective electronic device. In this regard, different finger gestures are mapped to different commands. However, it is sometimes difficult to determine which finger gesture is mapped to which command.

SUMMARY

The disclosed subject technology relates to a computer-implemented method for processing touch input. The method includes detecting, on a touch interface, touch input including an initial press action, wherein the initial press action is associated with a number of simultaneous touches, and wherein the initial press action is maintained for a predetermined period of time. The method also includes determining, based on the number of simultaneous touches, one or more commands that are mapped to one or more sequences of user interaction, wherein each of the one or more sequences of user interaction is initiated by the initial press action. The method also includes providing for display, one or more graphical interface components, each of the one or more graphical interface components corresponding to a different one of the one or more sequences of user interaction, wherein each of the one or more graphical interface components indicates at least part of the corresponding sequence of user interaction, and indicates the respective command mapped to the corresponding the sequence of user interaction.

The disclosed subject technology further relates to a system for processing touch input. The system includes one or more processors, and a machine-readable medium including instructions stored therein, which when executed by the processors, cause the processors to perform operations including detecting, on a touch interface, touch input including an initial press action, wherein the touch input is associated with a number of simultaneous touches, and wherein the initial press action is maintained for a predetermined period of time. The operations further include determining, based on the number of simultaneous touches, one or more commands that are mapped to one or more sequences of user interaction, wherein each of the one or more sequences of user interaction is initiated by the initial press action. The operations further include providing for display, one or more graphical interface components, each of the one or more graphical interface components corresponding to a different one of the one or more graphical interface components indicates at least part of the corresponding sequence of user interaction, and indicates the respective command mapped to the corresponding the sequence of user interaction. The operations further include detecting, on the touch interface, a follow-through action subsequent to the initial press action. The operations further include identifying a user command that is executed in response to the initial press action and the follow-through action. The operations further include adjusting the one or more graphical interface components based on the identified user command.

The disclosed subject technology further relates to a machine-readable medium including instructions stored therein, which when executed by a system, cause the system to perform operations including detecting, on a touch interface of a touch interface, touch input including an initial press action, wherein the touch input is associated with a number of simultaneous touches, and wherein the initial press action is maintained for a predetermined period of time. The operations further include determining, based on the number of simultaneous touches, one or more commands that are mapped to one or more sequences of user interaction, wherein each of the one or more sequences of user interaction is initiated by the initial press action. The operations further include providing for display, one or more graphical interface components, each of the one or more graphical interface components corresponding to a different one of the one or more sequences of user interaction, wherein each of the one or more graphical interface components indicates at least part of the corresponding sequence of user interaction, and indicates the respective command mapped to the corresponding the sequence of user interaction. The operations further include detecting, on the touch interface, a follow-through action subsequent to the initial press action. The operations further include identifying a user command that is executed in response to the initial press action and the follow-through action. The operations further include adjusting the one or more graphical interface components based on the identified user command.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive. It is to be understood that both the foregoing general description and the following detailed description are exemplary and explanatory and are intended to provide further explanation of the subject technology as claimed.

BRIEF DESCRIPTION OF THE DRAWINGS

Certain features of the subject technology are set forth in the appended claims. However, for purpose of explanation, several embodiments of the subject technology are set forth in the following figures.

FIG. 4A illustrates an example of another graphical interface component corresponding to different sequences of user interaction initiated by a three finger press action.

FIG. 4B illustrates an example of a graphical interface component corresponding to different sequences of user interaction initiated by a four finger press action.

FIG. 4C illustrates another example of a graphical interface component corresponding to different sequences of user interaction initiated by a four finger press action.

FIG. 4D illustrates of another example of a graphical interface component corresponding to different sequences of user interaction initiated by a three finger press action.

DETAILED DESCRIPTION

Figure 1:
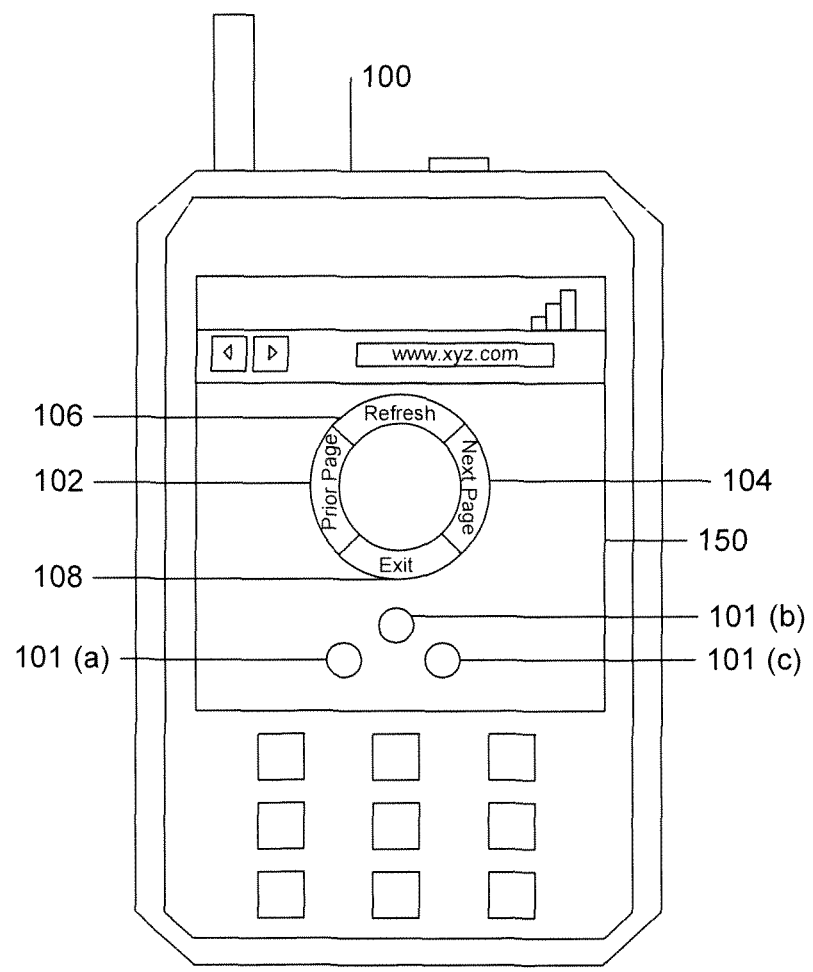
FIG. 1 illustrates an example of an electronic device displaying graphical interface components corresponding to different sequences of user interaction initiated by a three finger press action.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

In accordance with the subject disclosure, a system and a method for processing touch input are provided. The subject technology runs on any electronic device that supports a touch interface. Examples of touch interfaces include but are not limited to touchscreen interfaces, touch pad interfaces, etc. Example electronic devices include but are not limited to smartphone electronic devices, laptop computers, tablet electronic devices, etc. A sequence of user interaction that a user is seeking to execute is determined based on possible commands that are associated with the sequence of user interaction. Graphical interface components (e.g., halo shaped graphical representations, etc.) corresponding to possible commands that are associated with the sequence of user interaction are then provided to help the user identify each of the possible commands that are associated with the sequence of interaction.

A touch input is detected on a touch interface of an electronic device, where the touch input is associated with a number of simultaneous touches. In one example, the touch input includes a press action against the touch interface. The press action initiates the user interaction and can be executed with one or more fingers. After the press action is maintained for a threshold period of time, possible user commands that are mapped to one or more sequences of user interaction that are initiated by the press action are determined.

One or more graphical interface components, each of which correspond to a different one of the one or more sequences of user interaction, are then provided for display on the electronic device. In one example, each of the one or more displayed graphical interface components indicates at least part of the corresponding sequence of user interaction. Furthermore, each of the one or more displayed graphical interface components provides a visualization of the respective command that is mapped to the corresponding sequence of user interaction. At this stage, possible sequences of interaction that are initiated with the initial press action are provided for display. When a follow-through action subsequent to the initial press action is detected, a user command mapped to a sequence of interaction having the initial press action and the follow-through action is determined. The graphical interface component corresponding to the determined command is maintained for display while graphical interface components corresponding to other user commands are either removed from display or are obstructed.

The size, shape, color, and/or intensity of graphical interface components may alter during the course of a sequence of user interaction. Additional information about user commands that are mapped to one or more sequences of interaction may be provided to the user if the user, after performing an initial press action, hesitates to continue with a follow-through action. The additional instructions may be provided as text content, audio content and/or video content. Similarly, if the user pauses for more than a threshold period of time after partially performing a sequence of interaction, the user may be provided with additional information about one or more possible actions the user can take to execute the command that is associated with the sequence of interaction that the user has partially performed or to execute a different command based on a similar sequence of interaction.

FIG. 1 illustrates an example of an electronic device displaying graphical interface components corresponding to different sequences of user interaction initiated by a three finger press action. In some example aspects, electronic device 100 may include any machine having a touch interface. In the example of FIG. 1, electronic device 100 is depicted as a smartphone. Additional examples of electronic device 100 include mobile devices (e.g., smartphones, tablet computers, PDAs, and laptop computers), portable media players, desktop computers or other computing devices that have a touch interface.

In the example of FIG. 1, an application running on electronic device 100 provides an interface for displaying a webpage. Electronic device 100 detects touch input with respect to touchscreen 150. The touch input includes an initial press action that is maintained for a predetermined period of time. In the example of FIG. 1, a press action is performed by a user pressing three fingers 101(a), 101(b), and 101(c) against touchscreen interface 150 for a predetermined period of time. Electronic device 100 then determines, based on the number of simultaneous touches, possible commands that are mapped to at least one sequence of interaction that is initiated by the initial press action.

Electronic device 100 then provides for display one or more graphical interface components that correspond to different sequences of user interaction. In the example of FIG. 1, electronic device 100 provides a radial menu containing four graphical interface components 102, 104, 106, and 108 for display after determining possible sequences of user interaction that are initiated by the three finger press action. Graphical interactive element 102 corresponds to a sequence of interaction that is initiated by pressing touchscreen 150 with three fingers 101(a), 101(b), and 101(c) for a predetermined period of time followed by sliding three fingers 101(a), 101(b), and 101(c) at least a predetermined distance to the left. A command to view a previously displayed page, which corresponds to graphical interface component 102 is executed if a user slides three fingers 101(a), 101(b), and 101(c) across touchscreen 150 for at least the predetermined distance across touchscreen 150. Graphical interface component 104 corresponds to a sequence of interaction that is initiated by pressing touchscreen 150 with three fingers 101(a), 101(b), and 101(c) for a predetermined period of time followed by sliding three fingers 101(a), 101(b), and 101(c) a predetermined distance to the right. A command to view a subsequently displayed page, which corresponds to graphical interface component 104 is executed if the user slides three fingers 101(a), 101(b), and 101(c) to the right for the predetermined distance.

Graphical interactive element 106 corresponds to a sequence of interaction that is initiated by pressing touchscreen 150 with three fingers 101(a), 101(b), and 101(c) for a predetermined period of time followed by sliding the three fingers 101(a), 101(b), and 101(c) towards upward for a predetermined distance. A command to request the web application to reload a currently displayed webpage, which corresponds to graphical interface component 106 is executed if the user slides three fingers 101(a), 101(b), and 101(c) upward for at least the predetermined distance. Graphical interactive element 108 corresponds to a sequence of interaction that is initiated by pressing touchscreen 150 with three fingers 101(a), 101(b), and 101(c) for a predetermined period of time followed by sliding the three fingers 101(a), 101(b), and 101(c) downward for a predetermined distance. A command to exit the web application, which corresponds to graphical interface component 104 is executed if the user slides three fingers 101(a), 101(b), and 101(c) downward for the predetermined distance.

Figure 2:
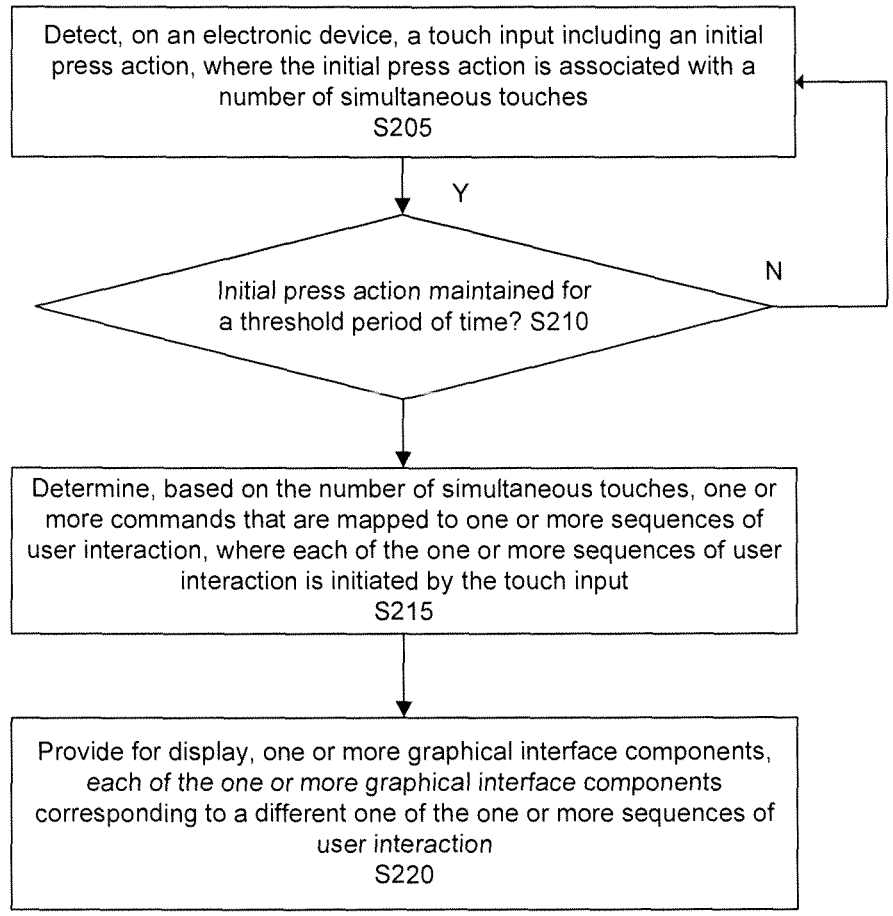
FIG. 2 illustrates an example process for processing touch input.

FIG. 2 illustrates an example process for processing touch input. Although the operations in process 200 are shown in a particular order, certain operations may be performed in different orders or at the same time. The process described in FIG. 2 may be performed by an application running on an electronic device that is communicably connected to a touch interface. In example aspects, the touch input is detected on a touch interface (e.g., touchscreen, touchpad, etc.) of the electronic device.

In block S205, a touch input including an initial press action, where the initial press action is associated with a number of simultaneous touches is detected on a touch interface. In block S210, if the initial press action is not maintained for a threshold period of time, the process repeats the process of detecting touch input on the touch interface. Alternatively, if the initial press action is maintained for a threshold period of time, the process proceeds to block S215, where the electronic device determines, based on the number of simultaneous touches, one or more commands that are mapped to one or more sequences of user interaction, where each of the one or more sequences of user interaction is initiated by the initial press action.

In example aspects, different sequences of user interaction are mapped to different commands. Furthermore, in example aspects, a sequence of user interaction may be mapped to different commands that are associated with different applications that are running on the electronic device. For example, a sequence of interaction including a press action with three fingers for at least a threshold period of time followed by an upward swipe with all three fingers may be mapped to a command to refresh a web application whereas the same sequence of interaction may be mapped to an exit command for a document processing application to exit the document processing application.

In block S220, the electronic device provides for display, one or more graphical interface components, each of the one or more graphical interface components corresponding to a different one of the one or more sequences of user interaction. Each of the one or more graphical interface components indicates at least part of the corresponding interaction and indicates the respective command mapped to the corresponding sequence of user interaction. In example aspects, the graphical interface components include halo shaped graphical representations that are displayed in the graphical display. In other example aspects, the graphical interface components are provided in a radial menu that is provided for display on the electronic device. The graphical interface components may include graphical representations that have a variety of different sizes, shapes, and, colors. The graphical interface components may also include different graphical animations that dynamically change in response to a user action.

The electronic device may detect on the touch interface, a follow-through action subsequent to the initial press action. Follow-through actions include, but are not limited to, swiping across the touch interface in one direction, expanding multiple fingers away from each other, moving multiple fingers closer to each other, etc. The electronic device may identify a command that is executed in response to the initial press action and the follow-through action. The electronic device may then adjust the one or more graphical interface components based on the identified user command. In one example, the size of a graphical interface component is adjusted in response to a sequence of interaction. In another example, one or more colors of the graphical interface component are adjusted in response to the sequence of interaction. In further example, the position of the graphical interface with respect to the screen of the electronic device is adjusted in response to the sequence of interaction.

The electronic device may detect a subsequent press action which is subsequent to the initial press action, where the subsequent press action is associated with a decrease in the number of simultaneous touches. In this case, the electronic device maintains display of the one or more graphical interface components. In one example aspect, if a user performs a press action with three fingers for at least a threshold period of time, graphical interface components corresponding to commands that are mapped to different sequences of interactions having the initial three finger press action are provided for display. If the user subsequently lifts one finger from the touch interface, display of the graphical interface components corresponding to commands that are mapped to the sequences of interaction having the initial three finger press action are maintained. If the user subsequently performs a follow-through action while maintaining a press action against the touchscreen with the two remaining fingers, a command that is mapped to a sequence of interaction that includes an initial three finger press action followed by the follow-through action while maintaining the three finger press action is executed. However, if the user releases all of the user's fingers from the touchscreen, then the sequence of interaction is cancelled and the graphical interface components are no longer provided for display on the electronic device.

The electronic device may also detect a subsequent press action which is subsequent to the initial press action, where the subsequent press action is associated with an increase in the number of simultaneous touches, and where the subsequent press action is maintained for the predetermined period of time. In this case, the electronic device determines, based on the number of simultaneous touches associated with the subsequent press action, one or more commands that are mapped to one or more sequences of user interaction that are initiated by the subsequent press action, and provides for display, graphical interface components corresponding to the one or more sequences of user interaction that are initiated by the subsequent press action.

The electronic device may provide for display, additional graphical interface components if no user command is executed beyond a second threshold period of time, where the second threshold period of time is greater than the predetermined period of time. According to one example aspect, the additional graphical interface components are provided for display if the initial press action is maintained beyond the second threshold period of time. According to another example aspect, the additional graphical interface components are provided for display if the subsequent follow-through action is maintained beyond the second threshold period of time. According to one example aspect, additional graphical interface components include a text-based content that explains how to execute commands that are mapped to the sequences of user interaction that are initiated by the initial press action. According to another example aspect, the additional graphical interface components include audio-based content that explains how to execute commands that are mapped to the sequences of user interaction that are initiated by the initial press action. According to a further example aspect, the additional graphical interface components include graphical content that explains how to execute commands that are mapped to the sequences of user interaction that are initiated by the initial press action.

Figure 3A:
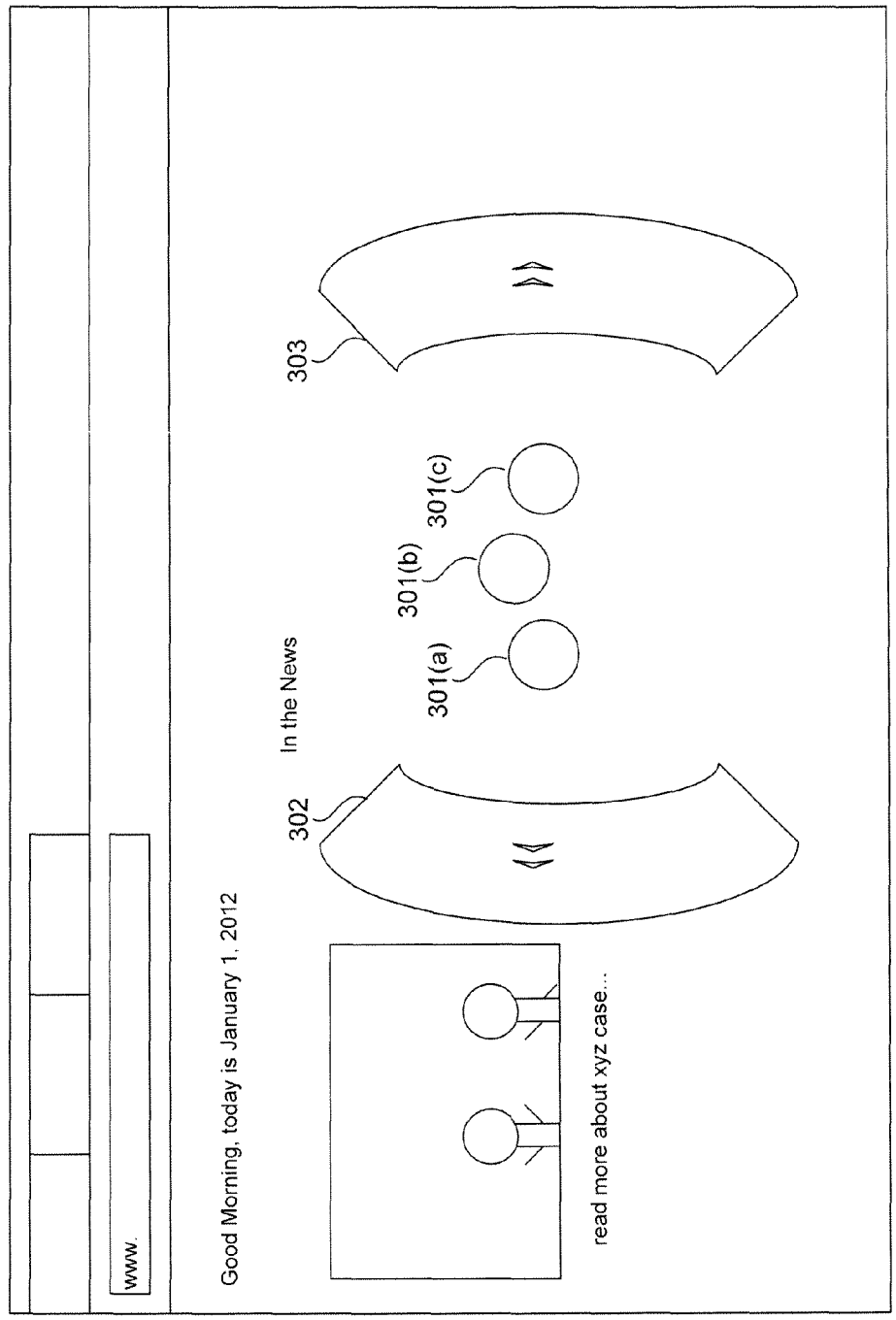
FIG. 3A illustrates an example of two graphical interface components corresponding to different sequences of user interaction initiated by a three finger press action.

FIG. 3A illustrates an example of two graphical interface components corresponding to different sequences of user interaction initiated by a three finger press action 301(a), 301(b), and 301(c). In the example of FIG. 3A, a first halo shaped graphical representation of graphical interface component 302 and a second halo shaped graphical representation of graphical interface component 303 are provided for display on the display screen. In the example of FIG. 3A, halo shaped graphical interface component 302 corresponds to a sequence of user interaction that includes pressing the touch interface with three fingers 301(a), 301(b), and 301(c) for a threshold period of time and subsequently sliding the three fingers 301(a), 301(b), and 301(c) to the left side of the display screen. In the example of FIG. 3A, halo shaped graphical interface component 303 corresponds to a sequence of user interaction that includes pressing the touch interface with three fingers 301(a), 301(b) and 301(c) for a threshold period of time and subsequently sliding the three fingers 301(a), 301(b), and 301(c) to the right side of the display screen.

Figure 3B:
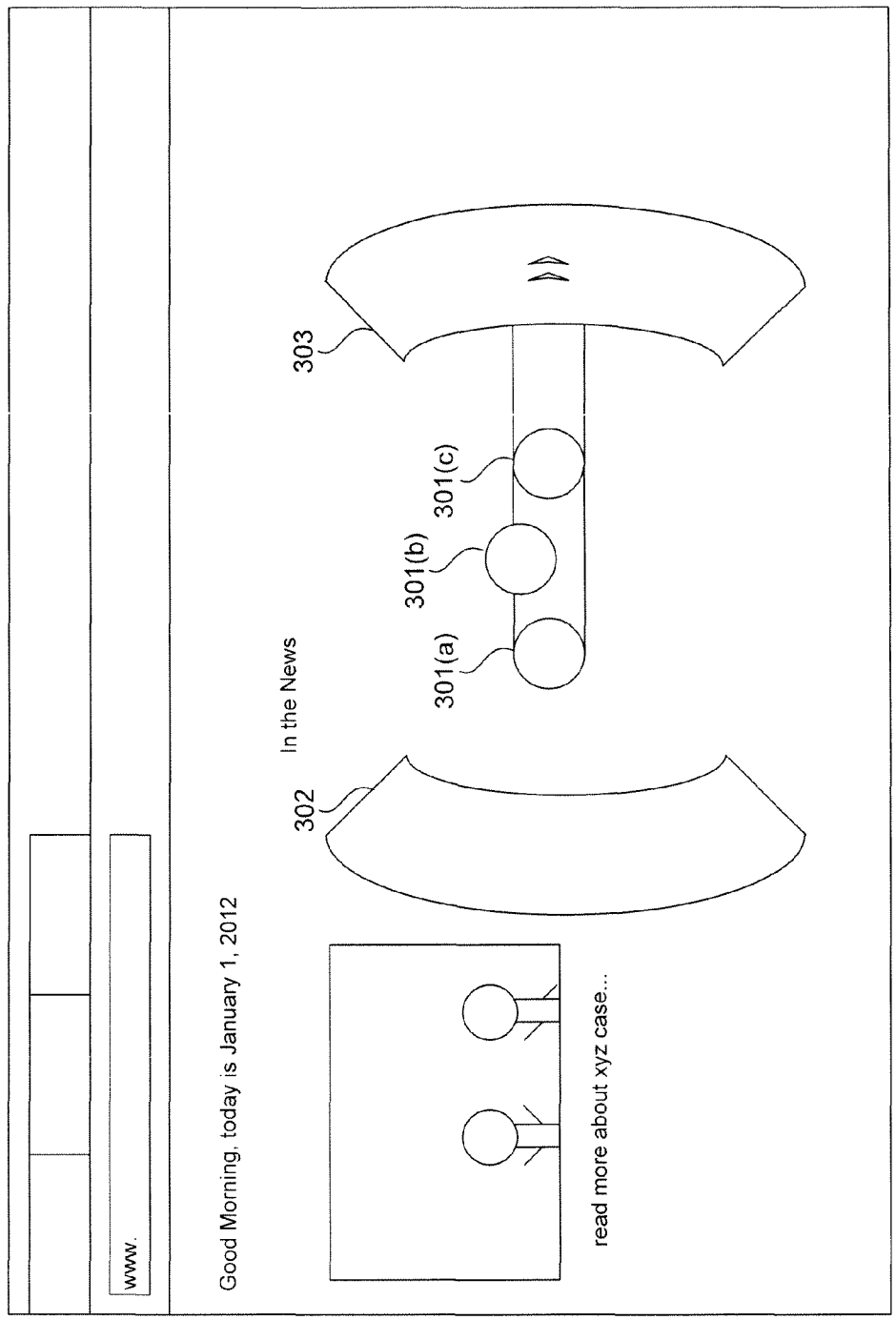
FIG. 3B illustrates examples of adjustments to the two graphical interface components of FIG. 3A in response to a follow-though action.

FIG. 3B illustrates examples of adjustments to the two graphical interface components of FIG. 3A in response to a follow-though action. When a follow-through action subsequent to the initial press action is detected, the subject technology identifies a user command mapped to a sequence of interaction having the initial press action and the follow-through action. In the example of FIG. 3B, the graphical interface component corresponding to the determined command is maintained for display while graphical interface components corresponding to other user commands are either removed from display or are obstructed. In the example of FIG. 3B, if the user presses against the touch interface of the user's electronic device with three fingers 301(a), 301(b), and 301(c) for a threshold period of time and subsequently slides all three fingers towards the right side of the touch interface, halo shaped graphical interface component 303 is maintained while halo shaped graphical interface component 302 is grayed out. In other example aspects, color, intensity, display size, and/or other attributes of graphical interface components 302 and 303 may dynamically change in response to the follow-through action. For example, graphical interface component 303 may continue to grow brighter and may increase in size as the user continues to drag the user's three fingers 301(a), 301(b), and 301(c) towards the right side of the touch interface while maintaining a three finger press against the touch interface.

Figure 3C:
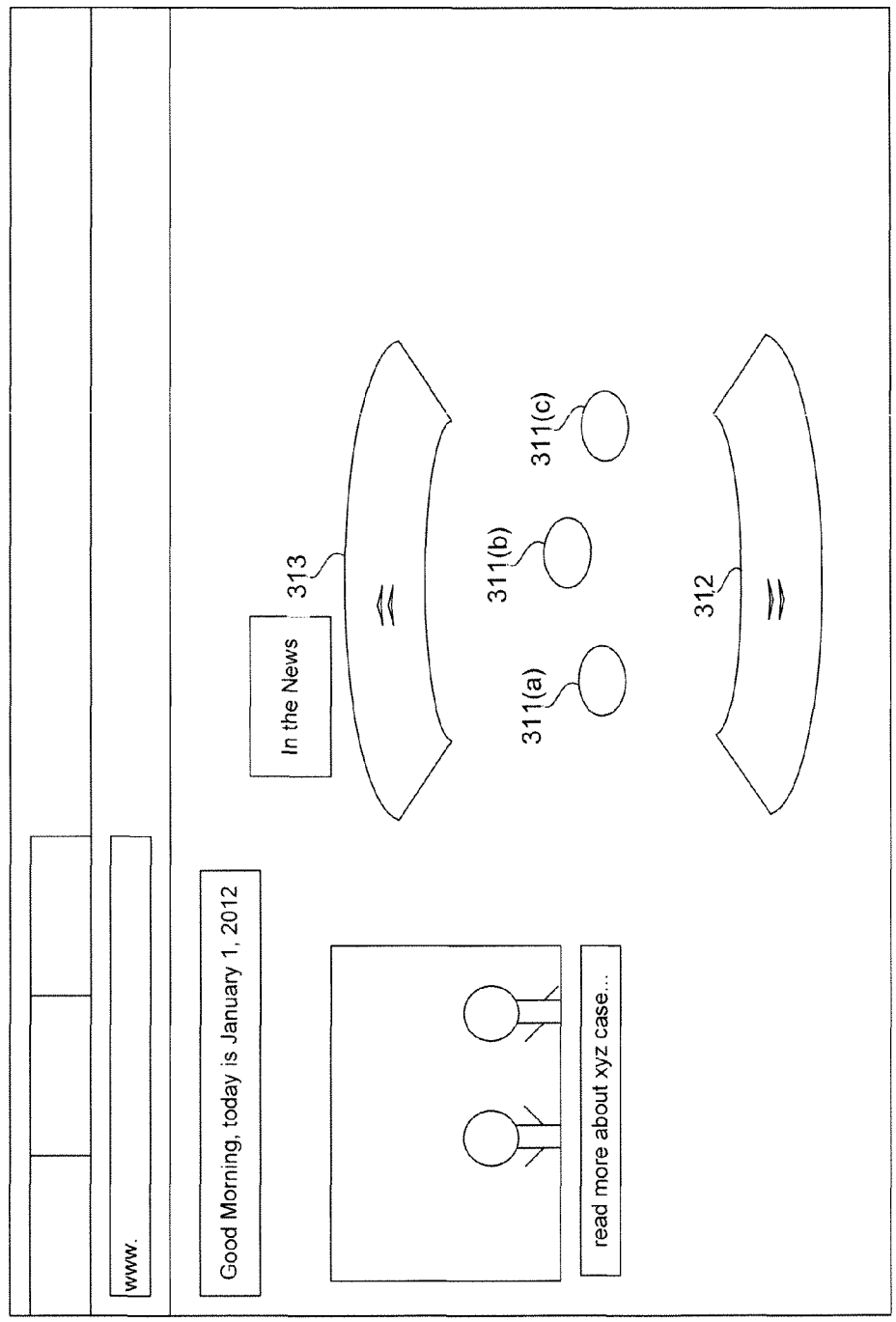
FIG. 3C illustrates another example of two graphical interface components corresponding to different sequences of user interaction initiated by a three finger press action

FIG. 3C illustrates another example of two graphical interface components corresponding to different sequences of user interaction initiated by a three finger press action 311(a), 311(b), and 311(c). In the example of FIG. 3C, a first halo shaped graphical representation of graphical interface component 312 and a second halo shaped graphical representation of graphical interface component 313 are provided for display on the display screen. In the example of in FIG. 3C, halo shaped graphical interface component 312 corresponds to a sequence of user interaction that includes pressing the touch interface with three fingers 311(a), 311(b), and 311(c) for a threshold period of time and subsequently sliding the three fingers 311(a), 311(b), and 311(c) upward with respect to the display screen. In the example of FIG. 3C, halo shaped graphical interface component 313 corresponds to a sequence of user interaction that includes pressing the touch interface with three fingers 311(a), 311(b), and 311(c) for a threshold period of time and subsequently sliding the three fingers 311(a), 311(b), and 311(c) downward with respect to the display screen.

FIG. 4A illustrates an example of another graphical interface component corresponding to different sequences of user interaction initiated by a three finger press action. In the example of FIG. 4A, graphical interface component 402 is provided for display after an initial press action with three fingers 401(a), 401(b), and 401(c) is maintained for a predetermined period of time. Graphical interface component 402 provides a guide to two commands that are mapped to two sequences of user interaction that are initiated by the three finger press action. In the example of FIG. 4A, right arrow 404 corresponds to a command to switching a first tab with a second tab that is to the right of the first tab, which can be executed by sliding the three fingers to the right while maintaining the press action. In the example of FIG. 4A, left arrow 406 corresponds to a command to switch the first tab with a third tab that is to the left of the first tab, which can be executed by sliding the three fingers to the left while maintaining the press action.

FIG. 4B illustrates an example of a graphical interface component corresponding to different sequences of user interaction initiated by a four finger press action. In the example of FIG. 4B, graphical interface component 412 is provided for display after an initial press action with four fingers 411(a), 411(b), 411(c), and 411(d) is maintained for a predetermined period of time. Graphical interface component 412 provides a guide to four commands that are mapped to four sequences of user interaction that are initiated by the four finger press action. In the example of FIG. 4B, left arrow 414 corresponds to a command to arrange a position of a window in a left direction, which can be executed by sliding the four fingers to the left while maintaining the press action. In the example of FIG. 4B, right arrow 415 corresponds to a command to arrange a position of a window in the right direction, which can be executed by sliding the four fingers to the right while maintaining the press action. In the example of FIG. 4B, down arrow 416 corresponds to a command to arrange a position of a window in a downward position, which can be executed by sliding the four fingers downward while maintaining the press action. As shown in FIG. 4B. up arrow 417 corresponds to a command to arrange a position of a window in an upward position, which can be executed by gliding the four fingers upward while maintaining the press action.

FIG. 4C illustrates another example of a graphical interface component corresponding to different sequences of user interaction initiated by a four finger press action. In the example of FIG. 4C, graphical interface component 422 is provided for display after an initial press action with four fingers 421(*a*), 421(*b*), 421(*c*), and 421(*d*) is maintained for a predetermined period of time. Graphical interface component 422 provides a guide to three commands that are mapped to three sequences of user interaction that are initiated by the four finger press action. In the example of FIG. 4C, a command to maximize an interface 424 can be executed by sliding the four fingers outwardly and away from each other while maintaining the press action. In the example of FIG. 4C, a command to minimize an interface 426 can be executed by sliding the four fingers towards each other while maintaining the press action. In the example of FIG. 4C, a command to move the display location of an interface 428 with respect to the display screen can be executed by sliding the four fingers to the left side of the display screen or to the right side of the display screen while maintaining the press action.

FIG. 4D illustrates of another example of a graphical interface component corresponding to different sequences of user interaction initiated by a three finger press action. In the example of FIG. 4D, graphical interface component 432 is provided for display after an initial press action with three fingers 431(*a*), 431(*b*), and 431(*c*) is maintained for a predetermined period of time. Graphical interface component 432 provides a guide to two commands that are mapped to two sequences of user interaction that are initiated by the three finger press action. In the example of FIG. 4D, a command to switch tabs 436 can be executed by sliding the three fingers to the left side of the display screen or to the right side of the display screen while maintaining the press action. As shown in FIG. 4D, a command to switch interfaces 434 can be executed by sliding the three fingers upward or downward while maintaining the press action.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Figure 5:
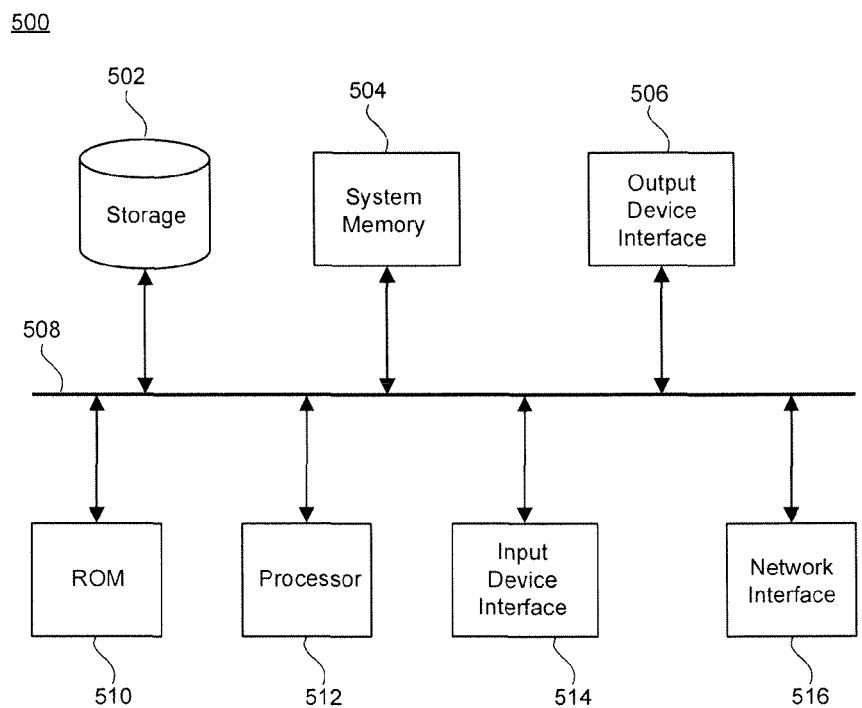
FIG. 5 conceptually illustrates an electronic system with which some implementations of the subject technology are implemented.

FIG. 5 conceptually illustrates an electronic system with which some implementations of the subject technology are implemented. Electronic system 500 can be a laptop computer, a desktop computer, smartphone, PDA, a tablet computer or any other sort of device 102, 104, and 106. Such an electronic system includes various types of computer readable media and interfaces for various other types of computer readable media. Electronic system 500 includes a bus 508, processing unit(s) 512, a system memory 504, a read-only memory (ROM) 510, a permanent storage device 502, an input device interface 514, an output device interface 506, and a network interface 516.

Bus 508 collectively represents all system, peripheral, and chipset buses that communicatively connect the numerous internal devices of electronic system 500. For instance, bus 508 communicatively connects processing unit(s) 512 with ROM 510, system memory 504, and permanent storage device 502.

From these various memory units, processing unit(s) 512 retrieves instructions to execute and data to process in order to execute the processes of the subject disclosure. The processing unit(s) can be a single processor or a multi-core processor in different implementations.

ROM 510 stores static data and instructions that are needed by processing unit(s) 512 and other modules of the electronic system. Permanent storage device 502, on the other hand, is a read-and-write memory device. This device is a non-volatile memory unit that stores instructions and data even when electronic system 500 is off. Some implementations of the subject disclosure use a mass-storage device (such as a magnetic or optical disk and its corresponding disk drive) as permanent storage device 502.

Other implementations use a removable storage device (such as a floppy disk, flash drive, and its corresponding disk drive) as permanent storage device 502. Like permanent storage device 502, system memory 504 is a read-and-write memory device. However, unlike storage device 502, system memory 504 is a volatile read-and-write memory, such a random access memory. System memory 504 stores some of the instructions and data that the processor needs at runtime. In some implementations, the processes of the subject disclosure are stored in system memory 504, permanent storage device 502, and/or ROM 510. From these various memory units, processing unit(s) 512 retrieves instructions to execute and data to process in order to execute the processes of some implementations.

Bus 508 also connects to input and output device interfaces 514 and 506. Input device interface 514 enables the user to communicate information and select commands to the electronic system. Input devices used with input device interface 514 include, for example, alphanumeric keyboards and pointing devices (also called "cursor control devices"). Output device interfaces 506 enables, for example, the display of images generated by the electronic system 500. Output devices used with output device interface 506 include, for example, printers and display devices, such as cathode ray tubes (CRT) or liquid crystal displays (LCD). Some implementations include devices such as a touchscreen that functions as both input and output devices.

Finally, as shown in FIG. 5, bus 508 also couples electronic system 500 to a network (not shown) through a network interface 516. In this manner, the computer can be a part of a network of computers (such as a local area network ("LAN"), a wide area network ("WAN"), or an Intranet, or a network of networks, such as the Internet. Any or all components of electronic system 500 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's electronic device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to an electronic device (e.g., for purposes of displaying data to and receiving user input from a user interacting with the electronic device). Data generated at the electronic device (e.g., a result of the user interaction) can be received from the electronic device at the server.

It is understood that any specific order or hierarchy of steps in the processes disclosed is an illustration of exemplary approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa.

Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A computer-implemented method for processing touch input, the method comprising:
    detecting, on a touch interface, touch input comprising an initial press action, wherein the initial press action is associated with a number of simultaneous touches, and wherein the initial press action is maintained for a predetermined period of time;
    determining, based on the number of simultaneous touches, one or more commands that are mapped to one or more sequences of user interaction, wherein each of the one or more sequences of user interaction is initiated by the initial press action;
    providing for display, one or more graphical interface components, each of the one or more graphical interface components corresponding to a different one of the one or more sequences of user interaction, wherein each of the one or more graphical interface components indicates at least part of the corresponding sequence of user interaction, and includes an icon indicating the respective command mapped to the corresponding sequence of user interaction;
    detecting, on the touch interface, a follow-through action subsequent to the initial press action, wherein the follow-through action corresponds to one of the one or more sequences of interaction;
    identifying the graphical interface component for the one sequence of interaction corresponding to the follow-through action and associated with the number of simultaneous touches;
    removing display of the icon for each graphical interface component other than the identified graphical interface component;
    modifying, while receiving the follow-through action subsequent to the initial press action, the graphical interface component for the one sequence of interaction corresponding to the follow-through action;
    detecting, on the touch interface a delay in a performance of the follow-through action greater than a threshold period of time; and
    providing, in response to the detected delay in the performance of the follow-through action greater than the threshold period of time, additional instructions for performing the one sequence of interaction corresponding to the follow-through action,
    wherein when the follow-through action is associated with a decrease in the number of simultaneous touches, then continuing to display the graphical interface component for the one sequence of interaction corresponding to the follow-through action and associated with the number of simultaneous touches.

2. The computer-implemented method of claim 1, wherein the one or more graphical interface components comprise halo shaped graphical representations.

3. The computer-implemented method of claim 1, further comprising adjusting a size of the one or more graphical interface components based on the identified graphical user interface component.

4. The computer-implemented method of claim 1, further comprising adjusting a color of the one or more graphical interface components based on the identified graphical user interface component.

5. The computer-implemented method of claim 1, further comprising adjusting a displayed position of the one or more graphical interface components relative to one another based on the identified graphical user interface component.

6. The computer-implemented method of claim 1, further comprising:
    detecting, on the touch interface, a subsequent press action which is subsequent to the initial press action, wherein the subsequent press action is associated with an increase of the number of simultaneous touches, and wherein the subsequent press action is maintained for the predetermined period of time;
    determining based on the number of simultaneous touches associated with the subsequent press action, one or more commands that are mapped to one or more sequences of user interaction that are initiated by the subsequent press action; and
    providing for display one or more graphical interface components corresponding to the one or more sequences of user interaction that are initiated by the subsequent press action.

7. The computer-implemented method of claim 1, wherein the one or more graphical interface components are provided in a radial menu.

8. The computer-implemented method of claim 1, further comprising providing for display, one or more additional graphical interface components if no command is executed beyond a second predetermined period of time, wherein the second predetermined period of time is greater than the predetermined period of time.

9. The computer-implemented method of claim 8, wherein the one or more additional graphical interface components are provided for display if the initial press action is maintained beyond the second predetermined period of time.

10. The computer-implemented method of claim 8, wherein one of the one or more additional graphical interface components comprise text-based content.

11. The computer-implemented method of claim 8, wherein one of the one or more additional graphical interface components comprise audio-based content.

12. A system for processing touch input, the system comprising:
    one or more processors, and a machine-readable medium comprising instructions stored therein, which when executed by the processors, cause the processors to perform operations comprising:
    detecting, on a touch interface, touch input comprising an initial press action, wherein the touch input is associated with a number of simultaneous touches, and wherein the initial press action is maintained for a predetermined period of time;
    determining, based on the number of simultaneous touches, one or more commands that are mapped to one or more sequences of user interaction, wherein each of the one or more sequences of user interaction is initiated by the initial press action;
    providing for display, one or more graphical interface components, each of the one or more graphical interface components corresponding to a different one of the one or more sequences of user interaction, wherein each of the one or more graphical interface components indicates at least part of the corresponding sequence of user interaction, and includes an icon indicating the respective command mapped to the corresponding sequence of user interaction;
    detecting, on the touch interface, a follow-through action subsequent to the initial press action, wherein the follow-through action corresponds to one of the one or more sequences of interaction;
    identifying the graphical interface component for the one sequence of interaction corresponding to the follow-through action and associated with the number of simultaneous touches;
    removing display of the icon for each graphical interface component other than the identified graphical interface component;
    modifying, while receiving the follow-through action subsequent to the initial press action, the graphical interface component for the one sequence of interaction corresponding to the follow-through action;
    detecting, on the touch interface a delay in a performance of the follow-through action greater than a threshold period of time; and
    providing, in response to the detected delay in the performance of the follow-through action greater than the threshold period of time, additional instructions for performing the one sequence of interaction corresponding to the follow-through action,
    wherein when the follow-through action is associated with a decrease in the number of simultaneous touches, then continuing to display the graphical interface component for the one sequence of interaction corresponding to the follow-through action and associated with the number of simultaneous touches.

13. The system of claim 12, the operations further comprising:
    detecting, on the touch interface, a subsequent press action which is subsequent to the initial press action, wherein the subsequent press action is associated with an increase of a number of simultaneous touches, and wherein the subsequent press action is maintained for the predetermined period of time;
    determining based on the number of simultaneous touches associated with the subsequent press action, one or snore commands that are mapped to one or more sequences of user interaction that is initiated by the subsequent press action; and
    providing for display one or more graphical interface components corresponding to the one or more sequences of user interaction that are initiated by the subsequent press action.

14. The system of claim 12, wherein the one or more graphical interface components are provided in a radial menu.

15. The system of claim 12, the operations further comprising providing for display, one or more additional graphical interface components if the one or more sequences of user interaction is not executed after a second predetermined period of time.

16. The system of claim 12, wherein the one or more graphical interface components comprise halo shaped graphical representations.

17. A computer-readable medium comprising instructions stored therein, which when executed by a processor, cause the processor to perform operations comprising:
    detecting, on a touch interface, touch input comprising an initial press action, wherein the touch input is associated with a number of simultaneous touches, and wherein the initial press action is maintained for a predetermined period of time;
    determining, based on the number of simultaneous touches, one or more commands that are mapped to one or more sequences of user interaction, wherein each of the one or more sequences of user interaction is initiated by the initial press action;
    providing for display, one or more graphical interface components, each of the one or more graphical interface components corresponding to a different one of the one or more sequences of user interaction, wherein each of the one or more graphical interface components indicates at least part of the corresponding sequence of user interaction, and includes an icon indicating the respective command mapped to the corresponding sequence of user interaction;
    detecting, on the touch interface, a follow-through action subsequent to the initial press action, wherein the follow-through action corresponds to one of the one or more sequences of interaction;
    identifying the graphical interface component for the one sequence of interaction corresponding to the follow-through action and associated with the number of simultaneous touches;
    removing display of the icon for each graphical interface component other than the identified graphical interface component;
    modifying, while receiving the follow-through action subsequent to the initial press action, the graphical interface component for the one sequence of interaction corresponding to the follow-through action;
    detecting, on the touch interface a delay in a performance of the follow-through action greater than a threshold period of time; and
    providing, in response to the detected delay in the performance of the follow-through action greater than the threshold period of time, additional instructions for performing the one sequence of interaction corresponding to the follow-through action,
    wherein when the follow-through action is associated with a decrease in the number of simultaneous touches, then continuing to display the graphical interface component for the one sequence of interaction corresponding to the follow-through action and associated with the number of simultaneous touches.

\* \* \* \* \*